United States Patent
Mori et al.

(10) Patent No.: US 7,210,152 B2
(45) Date of Patent: Apr. 24, 2007

(54) OPTICAL HEAD AND OPTICAL RECORDING MEDIUM DRIVE

(75) Inventors: Eishin Mori, Kyoto (JP); Tatsuo Ito, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 497 days.

(21) Appl. No.: 10/814,187

(22) Filed: Apr. 1, 2004

(65) Prior Publication Data

US 2004/0199929 A1    Oct. 7, 2004

(30) Foreign Application Priority Data

Apr. 3, 2003    (JP) .............................. 2003-099988

(51) Int. Cl.
*G11B 7/08* (2006.01)
(52) U.S. Cl. ..................................... 720/658
(58) Field of Classification Search ................. 720/658
See application file for complete search history.

(56) References Cited

U.S. PATENT DOCUMENTS 5,453,962 A * 9/1995 Fujita et al. ............. 369/44.23
5,687,032 A * 11/1997 Takeshita et al. ........... 359/822

FOREIGN PATENT DOCUMENTS

| JP | 5-323166 | 12/1993 |
|----|----------|---------|
| JP | 10-334472 | 12/1998 |

* cited by examiner

*Primary Examiner*—Allen Cao
(74) *Attorney, Agent, or Firm*—Wenderoth, Lind & Ponack, L.L.P.

(57) ABSTRACT

Disclosed is an optical head, which comprises a semiconductor laser, a collimator lens for converting a beam emitted from the semiconductor laser light into parallel beam, a lens frame holding the collimator lens, a beam shaping prism for shaping the parallel beam passing through the collimator lens from an elliptic section into a circular section, an objective lens for converging the parallel beam passing through the beam shaping device on an optical recording medium formed with a track, and a photodetector for detecting a reflected light or transmitted light from an optical disk. The collimator lens is adhesively fixed to the lens frame at two positions opposed to one another along a radial direction corresponding to the minor axis direction of the cross section of the incoming parallel beam into the beam shaping prism. The optical head can suppress the displacement of detected-light spots in an photodetector caused by the displacement of an optical axis due to change in ambient temperature.

9 Claims, 7 Drawing Sheets

OPTICAL HEAD AND OPTICAL RECORDING MEDIUM DRIVE

BACKGROUND OF THE INVENTION

1. Field of the Invention

The present invention relates to an optical recording medium drive for optically recording, reproducing or erasing information onto or from an optical recording medium, such as an optical disk or an optical card. In particular, the present invention relates to an improvement of an optical head capable of reducing an optical-axis displacement due to the temperature change in an optical component, such as lens, or a housing thereof.

2. Related Art

An optical memory technology using an optical disk with pit patterns is increasingly applied to high-density high-capacity recording mediums, such as digital audio disks, videodisks, document file disks and data files. In the optical memory technology, information is recorded/reproduced onto/from the optical disk through a finely narrowed light beam with a high degree of accuracy and reliability. These recording/reproducing operations are entirely dependent on an associated optical system, and therefore it is critical to reduce the variation in characteristics of the optical system, particularly, due to temperature change.

An optical head is constructed by mounting various optical components, such as a light source, a photodetector, a half mirror and lenses, on a given frame. These optical components are required to be accurately mounted in their correct positions without causing the displacement in optical axis and focal position.

Figures 10A, 10B:
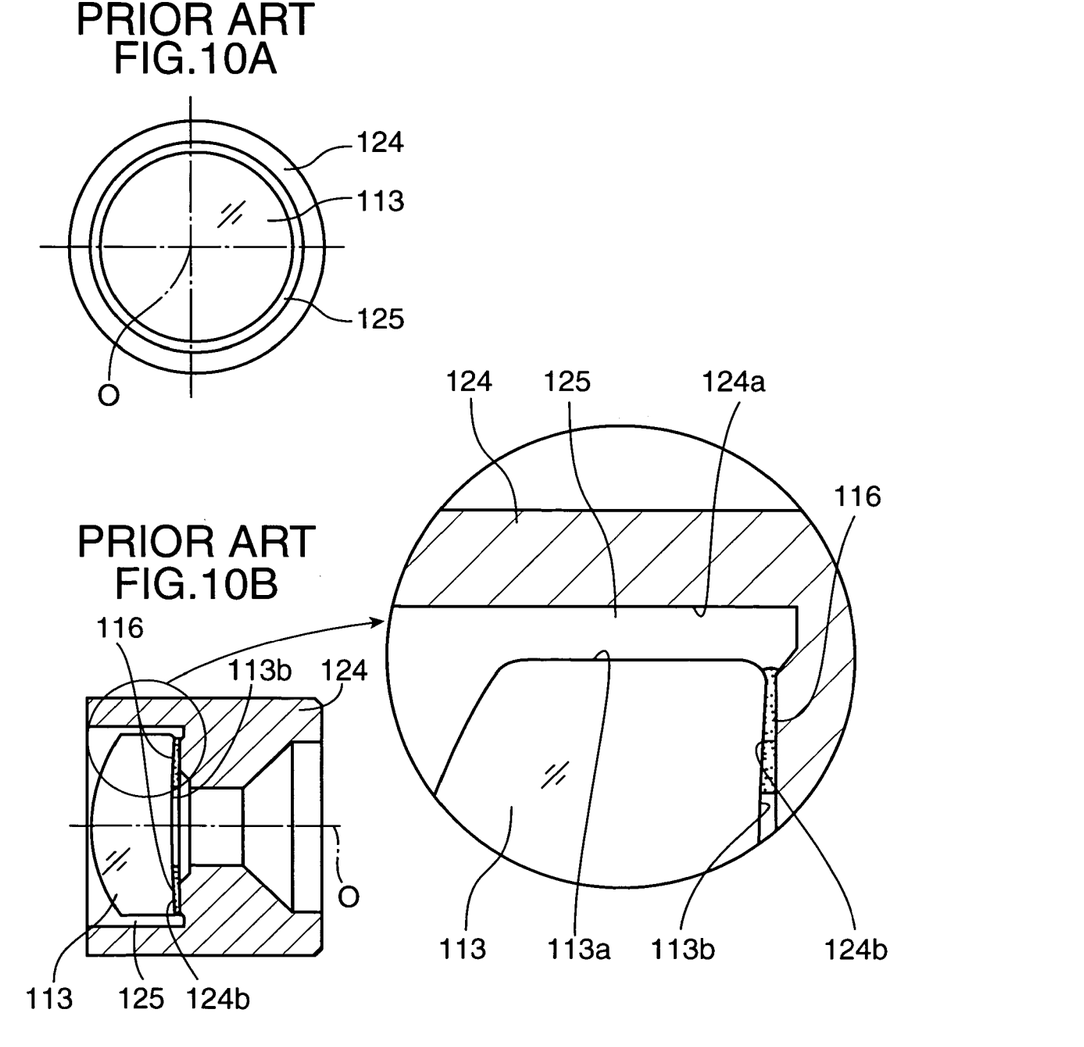
FIG. 10A is a view showing a conventional lens holding structure, seeing in the optical axis direction.
FIG. 10B is a vertical sectional view of the lens holding structure in FIG. 10A.

There have been known a lens holding structure for an optical pickup apparatus as disclosed, for example, in Japanese Patent Laid-Open Publication Nos. 5-323166 and 10-334472. As shown in FIGS. 10A and 10B, a lens holding structure disclosed in the Japanese Patent Laid-Open Publication No. 10-334472 comprises an approximately columnar lens frame 124 for holding a collimator lens 113. The lens frame 124 is formed with a hollow portion to provide an optical path having an optical axis O aligned with the central axis of the lens frame 124.

As shown in FIG. 10B, the hollow portion of the lens frame 124 has one open end formed into a reverse-tapered larger-diameter shape allowing a semiconductor laser to be attached thereto, and the other open end formed into a larger-diameter shape with a short tubular inner peripheral surface 124a. The collimator lens 113 is received and held in the hollow portion while being surrounded by the inner peripheral surface 124a.

The inner peripheral surface 124a has a radius slightly greater than that of the outer peripheral surface 113a of the collimator lens 113 to form a space 125 over the entire circumference between the inner peripheral surface 124a and the outer peripheral surface 113a.

The inner surface of the lens frame 124 is formed with a projecting surface 124b having a ring shape arranged rotationally symmetrically with respect to the optical axis O. In an operation of holding the collimator lens 113 within the lens frame 124, an adhesive 116 is applied onto the projecting surface 124b, and one 113b of the lens surfaces of the collimator lens 113 is brought into contact with the projecting surface 124b and fixedly held by the adhesive 116, so that the collimator lens 113 is positioned in the optical axis direction.

While the radius of the ring-shaped projecting surface 124b may be set to extend up to the inner peripheral surface 124a of the lens frame 124, it is preferably set to be less than the radius of the outer peripheral surface 113a of the collimator lens 113 so as to prevent the adhesive 116 from running over between the inner peripheral surface 124a of the lens frame 124 and the outer peripheral surface 113a of the collimator lens 113. In addition, even if the collimator lens 113 is eccentrically fixed, the holding state between the lens surface 113b and the projecting surface 124b can be stably maintained substantially without adverse affect therefrom.

The space 125 formed over the entire circumference between the inner peripheral surface 124a of the lens frame 124 and the outer peripheral surface 113a of the collimator lens 113 can effectively prevent the thermal deformation of the lens frame 124 due to the change of ambient temperature from affecting directly on the outer peripheral surface 113a of the collimator lens 113. If the lens frame 124 is designed to assure a larger volume in the space 125, an effect of suppressing the eccentricity between the collimator lens 113 and the lens frame 124 will be reduced. Thus, in this case, it is required to use a modified bonding method capable of maintaining the effect.

While the thermal deformation of the lens frame 124 due to the change of ambient temperature is likely to affect on the collimator lens 113 through the adhesive 116, a force of the thermal deformation of the lens frame 124 acting to move the collimator lens 113 in the radial direction can be expected to be dispersed in all directions and cancelled by the bonding structure where the collimator lens 113 is bonded to the ring-shaped projecting surface 124b of the lens frame 124 through the adhesive 116 applied to the ring-shaped projecting surface 124b. More specifically, the bonded surface of the collimator lens 113 fixed to the lens frame 124 is arranged rotationally symmetrically with respect to the optical axis O because it is bonded to the ring-shaped surface 124b through the adhesive 116. Thus, when the lens frame 124 is thermally expanded due to the change of ambient temperature, the bonded surface of the collimator lens 113 receives forces of the thermal expansion of the lens frame 124 acting outward in all directions. That is, the respective regions of the bonded surface located symmetrically with respect to the optical axis O receive the forces acting thereon at substantially the same strength in the opposite directions. Therefore, the forces can be mutually cancelled.

The optical head is required to assure an adequate operation under the wide circumstance from a high temperature to a low temperature. In particular, there is a strong need for an excellent temperature characteristic in which a light to be detected is not affected by an optical-axis displacement arising from the relative displacement between a laser light source and the collimator lens 113. Specifically, if the relative displacement between a laser-emitting point and the collimator lens 113 is caused by the expansion of the collimator lens 113, the lens frame 124 holding the collimator lens 113, and/or an outer frame for holding the lens frame 124, due to the change of atmospheric temperature, a resulting optical-axis displacement will be likely to cause the displacement of a detected-light spot in a detector. Therefore, it is desired to provide an optical head capable of achieving an excellent temperature characteristic even under unstable atmospheric temperature.

While the optical pickup apparatus disclosed in the above patent publications is intended to form the adhesively fixed portion into a ring shape so as to eliminate adverse affects from thermal expansion/contraction, the direction of the optical-axis displacement due to thermal expansion/contraction is practically varied by the variation in the applied amount of the adhesive 116 and/or the variation in the bonded position, and the adverse affects from thermal expansion/contraction cannot be adequately absorbed.

In addition, the adhesive 116 in direct contact with the lens surface 113b of the collimator lens 113 causes stains in the lens 113. Furthermore, the relatively large space formed between the lens frame 124 and the collimator lens 113 causes the increase in size of the apparatus, and the complicated shape of the holder leads to increased cost and essentially requires to perform an adjustment operation with higher accuracy.

SUMMARY OF THE INVENTION

In view of the above circumstances, it is therefore an object of the present invention to provide an optical head with a lens support structure for a lens integrated with a housing, and an optical recording medium drive incorporating the optical head, capable of suppressing the degradation in temperature characteristic while minimizing the increase in cost.

In order to achieve the above object, the present invention provides an optical head comprising a laser light source, a collimator lens for converting a beam emitted from the laser light source into a parallel beam, a lens frame holding the collimator lens, a beam shaping device for shaping the parallel beam passing through the collimator lens, an objective lens for converging the parallel beam passing through the beam shaping device on an optical recording medium formed with a track, and a photodetector for detecting a reflected light or transmitted light from the optical recording medium. In this optical head, the lens frame is designed to hold the collimator lens in such a manner that a straight line extending in a radial direction of the parallel beam having the largest ratio of the diameter of the parallel beam outgoing from the beam shaping device to the diameter of the parallel beam incoming into the beam shaping device at an entrance surface is located on the same plane together with a straight line extending in a direction along the displacement in a radial direction of the collimator lens.

According to the optical head of the present invention, even if the displacement of the collimator lens is caused by the change of atmospheric temperature or the like, the displacement of a detected-light spot otherwise caused by such a displacement can be minimized.

In the above optical head, the beam shaping device may be designed to shape a parallel beam having an elliptic cross-section into a parallel beam having a circular cross-section. In this case, the lens frame may be designed to hold the collimator lens in such a manner that a straight line extending in the minor axis of the elliptical cross-section of the parallel beam incoming into the beam shaping device at an entrance surface is located on the same plane together with a straight line extending in a direction along the displacement in said radial direction of the collimator lens.

According to the above structure, even if the displacement of the collimator lens is caused by the change of atmospheric temperature or the like, the displacement of a detected-light spot otherwise caused by such a displacement can be minimized.

In the above optical head, the collimator lens may be adhesively fixed to the lens frame in at least one of the positions of the outer peripheral surface of the collimator lens intersected by a straight line which passes through the optical axis of the collimator lens and extends in the radial direction.

Further, the collimator lens may be adhesively fixed to the lens frame in two positions of the outer peripheral surface of the collimator lens opposed to one another along the radial direction.

According to this structure, the adhesively fixed positions are arranged symmetrically with respect to the optical axis. Thus, even if the lens frame has an expansion or contraction due to the change of atmospheric temperature, respective forces from the adhesives arranged symmetrically with respect to the center of the lens frame will act on the collimator lens at approximately the same strength in the opposite directions, and can be mutually cancelled.

The above optical head may include an outer frame holding the lens frame. The outer frame has an inner peripheral surface formed with a cross-sectionally V-shaped portion. Further, the outer frame is arranged such that the apex of the V-shaped portion is located on a straight line that crosses the optical axis of the collimator lens at a right angle and extends in the radial direction. In this case, the lens frame may be in contact with the inner peripheral surface of the outer frame at two positions located on both sides of the apex of the V-shaped portion and symmetrically with respect to the straight line, and the outer frame may also be provided with a presser member for pressing the lens frame in the radial direction.

In the above structure, the lens frame may be made of a material having approximately the same linear expansion coefficient as that of the collimator lens.

According to this structure, even if the lens frame has an expansion or contraction, a resulting displacement of the collimator lens can be brought into line with the radial direction. Thus, the material of the outer frame can be freely selected while suppressing the displacement of the detected-light spot, so as to provide enhanced flexibility in design.

The inner peripheral surface of the V-shaped portion may have an apex angle in the range of 90 to 150 degrees. If this apex angle is set at a value less than 90 degrees, the apex of the V-shaped portion has to be arranged at a position away from the center of the collimator lens. This causes the increase in size of the outer frame. Further, if the apex angle is set at a value greater than 150 degrees, it will be difficult to stably hold the lens frame even using a leaf spring for pressing the lens frame.

The adhesive for fixing the collimator lens to the lens frame may be applied in each of the two positions at an amount in the range of 0.05 to 1.1% of the weight of the collimator lens. If the adhesive is applied at an amount of less than 0.05% of the weight of the collimator lens, a necessary adhesive force cannot be obtained. Further, if the amount of the adhesive is greater than 1.1%, an ineffective excess adhesive will be uselessly applied.

The present invention also provides an optical recording medium drive comprising the above optical head, a driving mechanism for driving the optical recording medium, and a servo mechanism for controlling the position of the objective lens of the optical head.

As above, according to the optical head and the optical recording medium drive of the present invention, the lens frame holds the collimator lens in such a manner that a straight line extending in a direction of the parallel beam incoming into the beam shaping device having the largest ratio at an entrance surface of the beam shaping device is located on the same plane together with the displacement direction of the collimator lens. Thus, the displacement of the detected-light spot can be minimized. Further, information can be accurately recorded or reproduced under even unstable atmospheric temperature to assure an adequate operation under the wide circumstance from a high temperature to a low temperature.

DESCRIPTION OF THE PREFERRED EMBODIMENT

With reference to the drawings, a preferred embodiment of the present invention will now be described in detail. The present invention, however, is not intended to be limited to the following specific embodiment.

Figure 1:
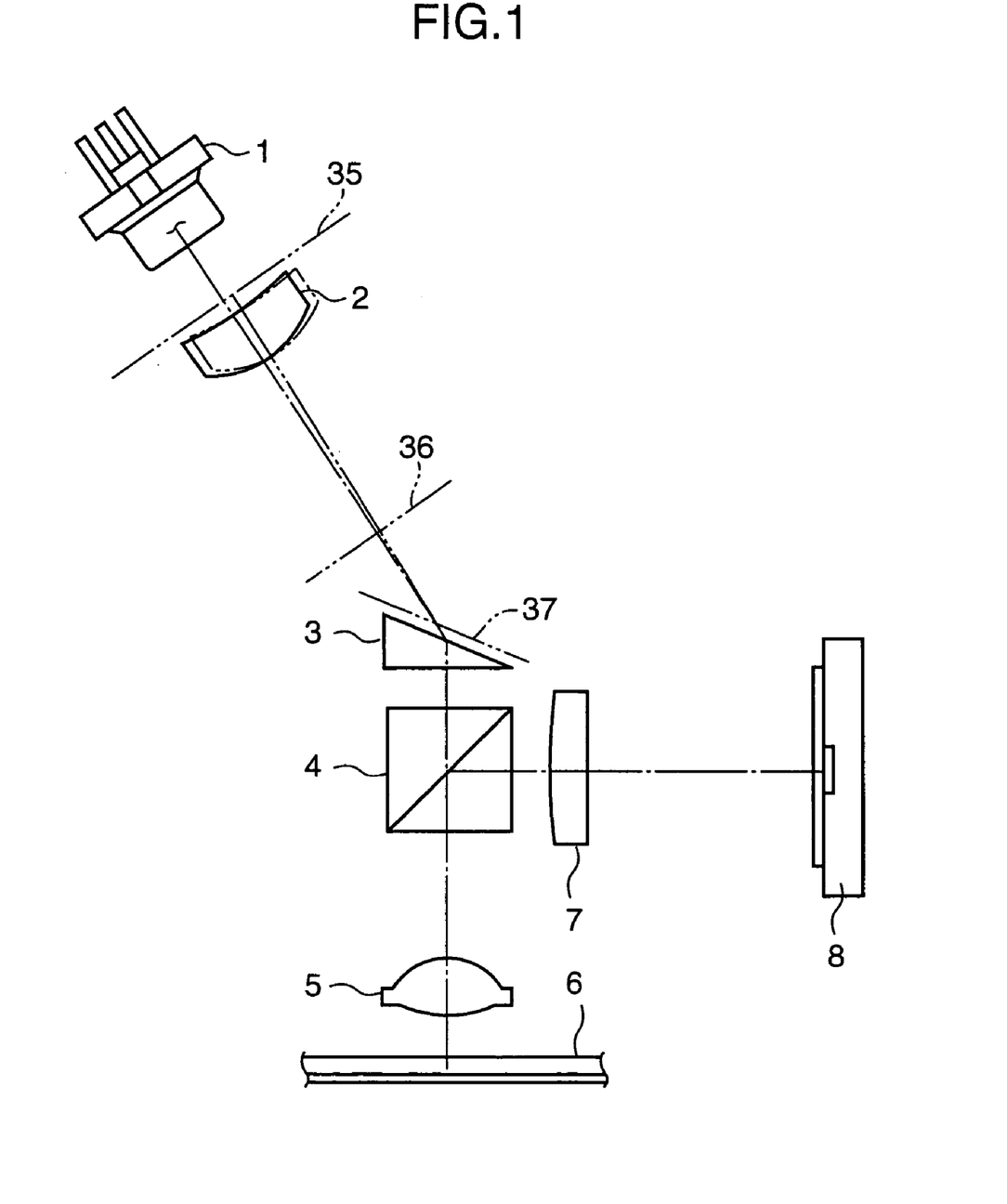
FIG. 1 is a schematic diagram showing an optical system of an optical head according to a first embodiment of the present invention.

FIG. 1 shows an optical head according to a first embodiment of the present invention. The structure of an optical system of this optical head will be briefly described.

As shown FIG. 1, the optical head according to the first embodiment comprises a semiconductor laser 1, a collimator lens 2, a beam shaping prism 3, a beam splitter 4, an objective lens 5, a detection lens 7, and a photodetector 8.

The collimator lens 2 is capable of converting a divergent beam emitted from the semiconductor leaser 1 into a parallel beam. The divergent beam emitted from the semiconductor leaser 1 has a cross-sectionally elliptic shape.

The beam shaping prism 3 is capable of shaping the parallel beam from the cross-sectionally elliptic shape into a cross-sectionally circular shape to provide a uniform light-intensity distribution in its circumferential direction. Thereinafter, a parallel beam entering into the beam shaping prism 3 will be referred to as "incoming beam", and a parallel beam getting out of the beam shaping prism 3 will be referred to as "outgoing beam". When the incoming parallel beam is shaped to allow the outgoing parallel beam to have a cross-sectionally circular shape, the elliptical cross section of the incoming parallel beam may be narrowed in the major axis, or may be extended in the minor axis.

The outgoing beam is led to the beam splitter 4. The beam splitter 4 is capable of splitting frontward and return paths of the parallel beam to be transmitted therethrough. Then, the outgoing beam passing through the beam splitter 4 is converged on an optical disk 6 serving as an optical recording medium through the objective lens 5. A reflected light from the optical disk 6 passes through the objective lens 5 again. Then, the light is reflected by the beam splitter 4 for splitting forward/return paths, and converged through the detection lens 7 to enter into the photodetector 8.

As used in this specification, the term "optical recording medium" means both a recording medium configured to allow information to be recorded thereon, and a recording medium having information recorded thereon and configured to preclude information from being written thereinto, such as a reproduction-only recording medium.

Figure 2:
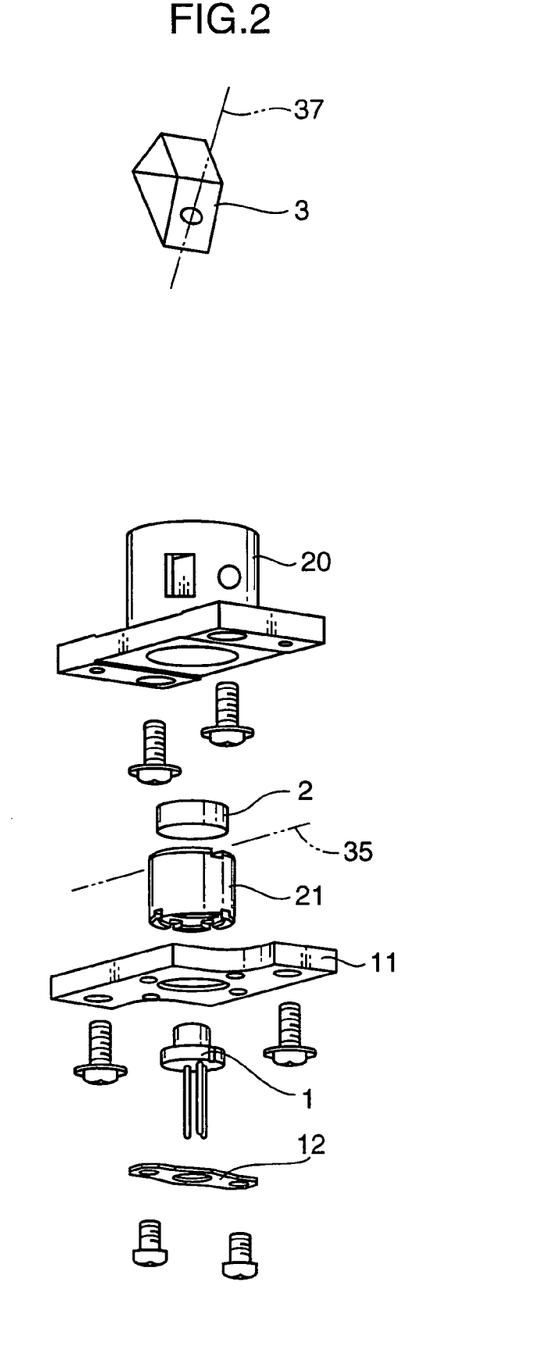
FIG. 2 is a perspective view showing a semiconductor laser, a collimator-lens holding structure, and a beam shaping prism according to the first embodiment.
Figure 3A:
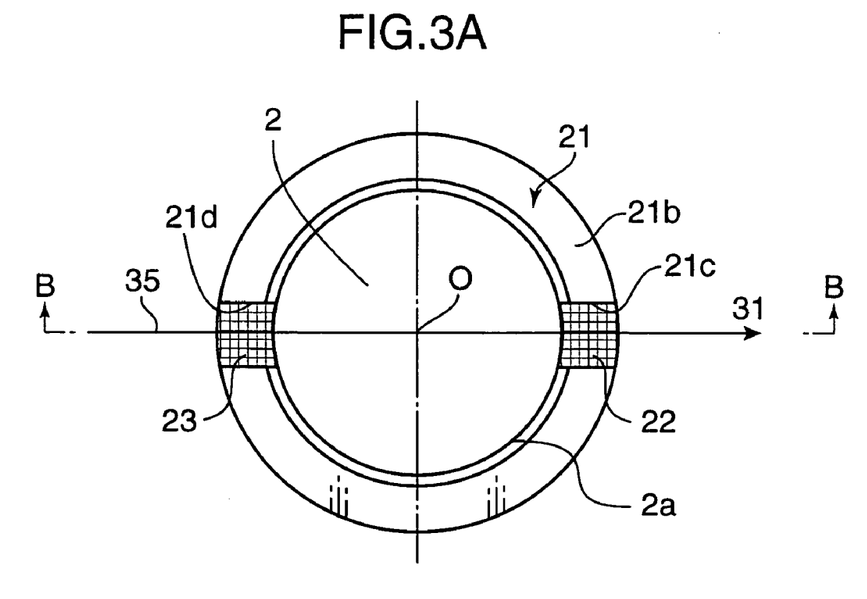
FIG. 3A is a front view of the collimator-lens holding structure according to the first embodiment, seeing in the optical axis direction.
Figure 3B:
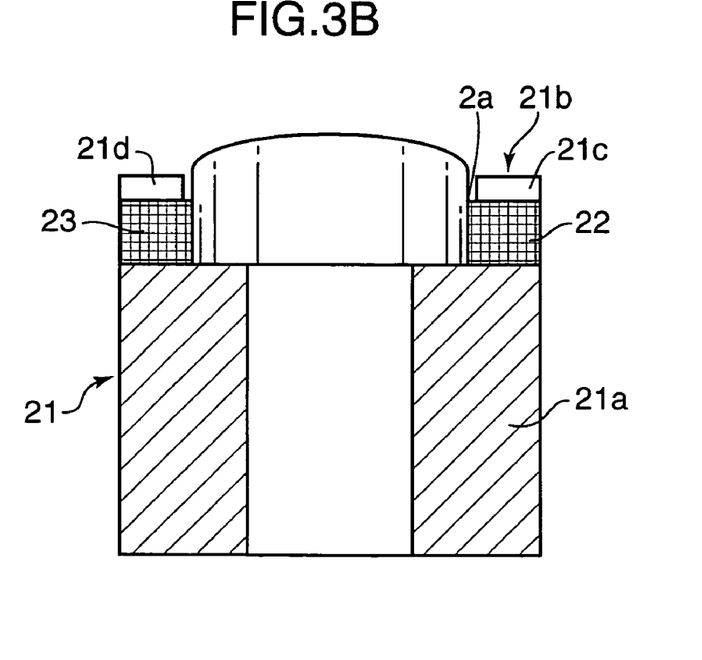
FIG. 3B is a sectional view taken along the line B—B in FIG. 3A.

FIG. 2 is a perspective view showing the semiconductor laser 1, a holding structure of the collimator lens 2, and the beam shaping prism 3. FIGS. 3A and 3B show a substantial part of the holding structure of the collimator lens 2, wherein FIG. 3A is a front view of a lens frame 21 for hording the collimator lens 2, seeing in the optical axis direction, and FIG. 3B is a sectional view taken along the line B—B in FIG. 3A.

As shown in FIG. 2, the semiconductor laser 1 is held by a laser plate 11 via a leaf spring 12. The leaf spring 12 presses the semiconductor leaser 1 to the laser plate 11 in the optical axis. The lens frame 21 is held by an outer frame 20 in such a manner that it is movable in the optical axis direction.

As shown in FIGS. 3A and 3B, the lens frame 21 includes a thick-walled cylindrical lens-frame body 21a, and a support portion 21b formed at one of the ends of the lens-frame body 21a. The support section 21b has a thinner wall than that of the lens-frame body 21a to form a step in the inner peripheral surface of the support section 21b. The support section 21b has an inner diameter slightly greater than the outer diameter of the collimator lens 2.

The support portion 21b is formed with a pair of grooves 21c, 21d. These groove 21c, 21d are formed at positions opposed to one another while interposing an optical axis O therebetween. That is, the grooves 21c, 21d are located at positions symmetrically with respect to the optical axis O. The lens frame 21 is arranged such that these grooves 21c, 21d are located at given positions in the circumferential direction thereof, respectively. The collimator lens 2 is arranged within the support portion 21b. In this position, two blocks of adhesives 22, 23 are applied, respectively, into the grooves 21c, 21d, so that the collimator lens 2 is adhesively fixed to the lens frame 21 through the outer peripheral surface 2a thereof.

An acrylic-based adhesive is used as the adhesives 22, 23. The applied amount of each of the adhesives 22, 23 is set in the range of 0.05 to 1.1%, preferably 0.5%, of the weight of the collimator lens 2, because a necessary adhesive force cannot be obtained if each of the adhesives 22, 23 is applied at an amount of less than 0.05% of the weight of the collimator lens 2, and an ineffective excess adhesive will be uselessly applied if the amount of the adhesive is greater than 1.1%. The applied amount of each of the adhesives 22, 23 in the grooves 21c, 21d is set at the same value as that of each of adhesives which are applied in four positions at 90-degree intervals in a conventional manner. Thus, the total applied amount of the adhesives 22, 23 is reduced as compared with the conventional manner. The applied amount of each of the adhesives 22, 23 is a value before dried (before hardened or cured).

The above given circumferential positions of the grooves 21c, 21d are specifically determined as follows. The lens frame 21 and the beam shaping prism 3 are arranged in a positional relationship such that a straight line 35 connecting the two opposed grooves 21c, 21d in a radial direction 31 is located on the same plane together with a straight line 37 extending in the minor axis of an elliptic shaped incoming beam entering into the beam shaping device 3 in an entrance surface. Then, considering the elliptic incoming beam is shaped to form a circular outgoing beam by enlarging the elliptic shape in the minor axis, the above straight line 37 extends along a direction so as to have the largest ratio of the diameter (or radius) of an outgoing beam getting out of the beam shaping device 3 to the diameter (or radius) of an incoming beam entering into the beam shaping device 3 at the entrance surface. In other words, the two grooves 21c, 21d or the two adhesively fixed positions between the collimator lens 2 and the lens frame 21 are located on the straight line 35 orthogonally intersecting with the optical axis O and extending in the radial direction 31. If the collimator lens 2 is displaced due to the variation in the applied amount of the adhesives 22, 23, the displacement direction of the collimator lens 2 will become identical to the direction 31 connecting the two grooves 21c, 21d. Thus, as shown in FIG. 1, the straight line 35 extending in the displacement direction is located on the plane together with the straight line 37 extending in the minor axis direction of the elliptic shape. Therefore, a straight line 36 extending in a direction along which an incoming beam into the beam shaping device 3 is inclined by the displacement of the collimator lens 2.

When the elliptic incoming beam is shaped to form a circular outgoing beam by narrowing the elliptic shape in the major axis, the minor axis direction of the elliptic shape has the largest ratio of the diameter of an outgoing beam to the diameter of the incoming beam. Thus, the radial direction 31 will also correspond to the minor axis direction.

Figure 4A:
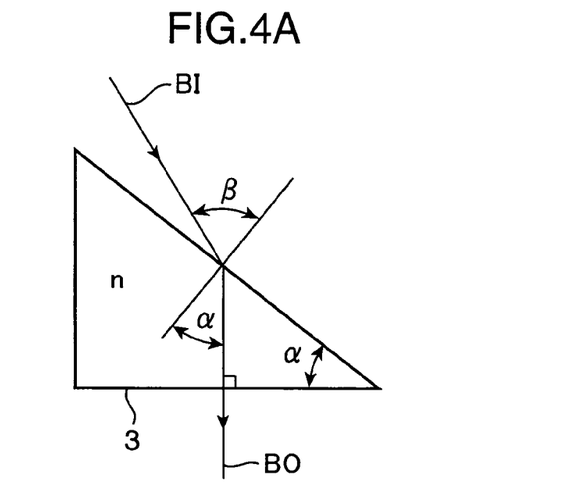
FIG. 4A is a characteristic diagram showing the respective paths of incoming and outgoing beams in a beam shaping prism when the collimator lens is in an optimal position.
Figure 4B:
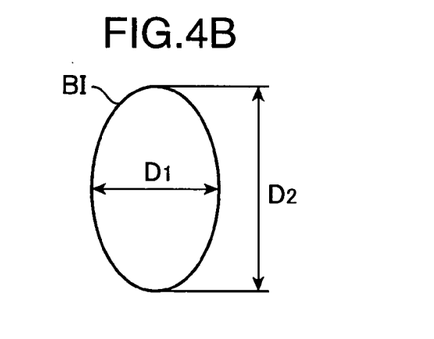
FIG. 4B is an explanatory diagram of the cross section of the incoming beam.
Figure 4C:
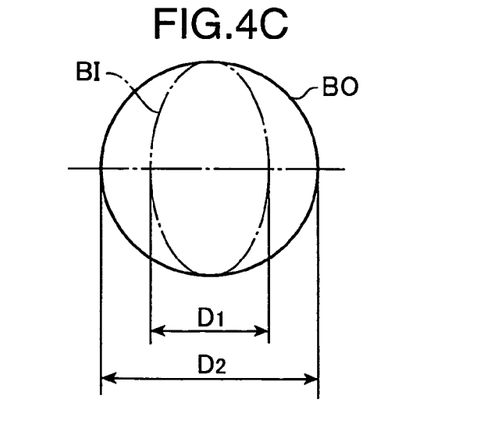
FIG. 4C is an explanatory diagram of the cross section of the outgoing beam.
Figure 5:
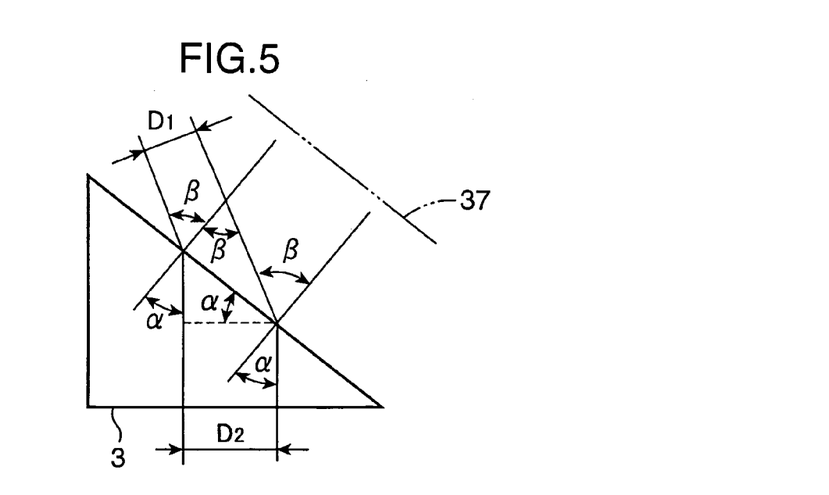
FIG. 5 is an explanatory diagram of a beam shaping ratio.
Figure 6:
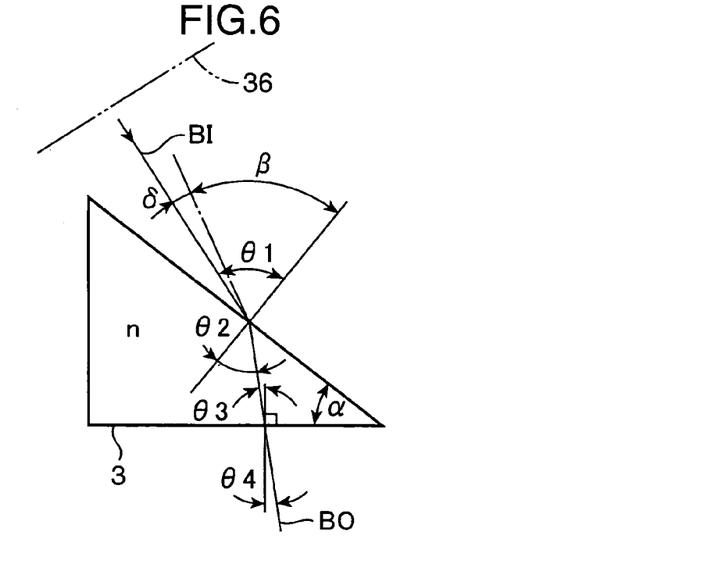
FIG. 6 is a characteristic diagram showing the respective paths of incoming and outgoing beams in the beam shaping prism when the collimator lens is in a displaced position.

With reference to FIGS. 4 to 6, the reason for adhesively fixing the collimator lens 2 to the lens frame 21 in the two positions opposed to one another along the radial direction 31 will be described below. The following description will be made in connection with one example where the elliptic incoming beam is shaped to form a circular outgoing beam by enlarging the elliptic shape in the minor axis.

FIG. 4A shows the respective paths of an incoming beam BI into the beam shaping prism 3, and an outgoing beam BO from the beam shaping prism 3. The beam paths in FIG. 4A are obtained when the collimator lens 2 is arranged in an optimal position. In this state, the incoming beam BI has an elliptic cross section with a diameter in the minor axis direction (short diameter) $D_1$ and a diameter in the major axis direction (long diameter) $D_2$ (FIG. 4B), and the outgoing beam has a circular cross section with a diameter $D_2$ (FIG. 4C).

In FIG. 4(A), given that the refraction index of the beam shaping prism 3 is n, the apex angle of the prism 3 or the refraction angle in an entrance surface being $\alpha$, the incidence angle of the incoming beam BI being $\beta$, and the ratio (beam shaping power) of the diameter $D_2$ of the outgoing beam to the short diameter $D_1$ of incoming beam BI being K. In this description, the short diameter $D_1$ is extended, and thus K>1.

In FIG. 4A, based on the Snell's law, the following relational expression (1) is satisfied in the entrance surface of the incoming beam BI:

$$\sin \beta / \sin \alpha = n \quad (1)$$

Further, as shown in FIG. 5, the following relational expression (2) is satisfied:

$$\cos \alpha / \cos \beta = D_2/D_1 = K \quad (2)$$

Secondly, assuming the state after the collimator lens 2 is displaced. As shown in FIG. 6, given that, due to the displacement of the collimator lens 2, the incidence angle of the incoming beam BI into the beam shaping prism 3 is inclined at angle $\delta$ and changed to $\theta_1$, and the outgoing angle (refraction angle) of the outgoing beam BO from the beam shaping prism 3 is changed to $\theta_4$. The factor of the displacement of the collimator lens 2 includes the variation in applied amount of the adhesives, and the expansion/contraction of the lens frame and/or other components due to the change of atmospheric temperature. If the collimator 2 is displaced, this displacement will be caused on the same plane as that of the radial direction 31, and thus the incidence angle of the incoming beam BI will be changed as shown in FIG. 6. Given that, in this state, the incidence angle in the entrance surface is $\theta_1$, the refraction angle in the entrance surface being $\theta_2$, and the incidence angle in the outgoing surface being $\theta_3$.

The following relational expression (3) is satisfied between $\theta_1$, $\beta$ and $\delta$:

$$\theta_1 = \beta + \delta \quad (3)$$

Further, based on the Snell's law in the entrance surface, the following relational expression (4) is satisfied:

$$\sin \theta_1 / \sin \theta_2 = n \quad (4)$$

The following relational expression (5) is also satisfied between $\theta_2$, $\alpha$ and $\theta_3$:

$$\theta_2 = \alpha + \theta_3 \quad (5)$$

Based on the Snell's law in the outgoing surface, the following relational expression (6) is satisfied:

$$\sin \theta_4 / \sin \theta_3 = n \quad (6)$$

In the relational expression (6), $\theta_4 \ll 1$. Thus, the relational expression (6) can be expressed as follows:

$$\theta_3 = \theta_4/n \quad (7)$$

The following relational expression (8) can be obtained by assigning the relational expression (7) to the relational expression (5):

$$\theta_2 = \alpha + (\theta_4/n) \quad (8)$$

The following relational expression (9) can also be obtained by assigning the relational expression (8) to the relational expression (4):

$$\sin \theta_1 / \sin [\alpha + (\theta_4/n)] = n \quad (9)$$

Then, the relational expression (3) can be used to obtain the following relational expression (10):

$$\sin(\beta+\delta) = n \sin [\alpha+(\theta_4/n)] \quad (10)$$

$$\sin \beta \cos \beta + \cos \beta \sin \delta = n[\sin \alpha \cos(\theta_4/n) + \cos \alpha \sin (\theta_4/n)] \quad (11)$$

where $\delta \approx 0$, thus, $$\cos \delta = 1, \sin \delta = \delta, \cos(\theta_4/n) = 1, \sin(\theta_4/n) = \theta_4/n$$

These are assigned to the relational expression (11) to obtain the following relational expression (13):

$$\sin \beta + \delta \cos \beta = n[\sin \alpha + (\theta_4/n)\cos \alpha] = n \sin \alpha + \theta_4 \cos \alpha \quad (12)$$

According to the relational expression (1), $$= \sin \beta + \theta_4 \cos \alpha \quad (13)$$

The relational expression (13) can be modified to obtain the following relational expressions (14) and (15):

$$\delta/\theta_4 = \cos \alpha / \cos \beta = i\,K \quad (14)$$

$$\theta_4 = \delta/K \quad (15)$$

That is, if the collimator 2 is displaced, this displacement will be directly reflected on the incidence angle of the incoming beam BI, and the outgoing angle $\theta_4$ in the outgoing surface will also be inclined in conjunction with the slight inclination of the incidence angle.

As seen in the relational expression (15), the outgoing angle $\theta_4$ is proportional to the inverse number of the beam shaping ratio $K(>1)$, and the lens frame can be arranged to satisfy such a positional relationship to reduce influences from the displacement of the collimator lens 2.

Figure 7:
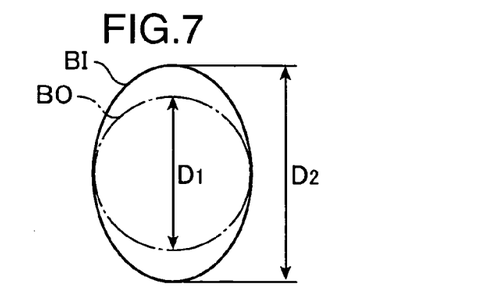
FIG. 7 is an explanatory diagram of the respective cross sections of incoming and outgoing beams when an elliptic incoming beam is narrowed in the major axis to have a circular shape.

As shown in FIG. 7, when the elliptical incoming beam BI is shaped to have a circular shape by narrowing the elliptical shape in the major axis direction, a positional relationship can be figured out by conceiving the travel of the beam reversely in FIGS. 5 and 6. For expediently referring to FIG. 5, given that the long diameter of an incoming beam BI is D2, and the diameter of an outgoing beam BO is D1. In this case, the beam shaping ratio (=D1/D2) is a positive number of less than 1 (one), and the inclination of the incoming beam BI to the entrance surface and the displacement of the outgoing angle of the outgoing beam BO are $\theta_4$ and $\delta$, respectively. Further, the definition of the beam shaping ratio in this case is reversed relative to the relational expression (2). Thus, differently from the relational expression (16), the following relational expressions (16) and (17) are satisfied:

$$\delta/\theta_4 = 1/K \quad (16)$$

$$\delta = (1/K)\theta_4 \quad (17)$$

Thus, in this case, while the displacement d of the outgoing angle of the outgoing beam BO is proportional to the inverse number of the beam shaping ratio K, the displacement $\delta$ of the outgoing angle can be reduced by arranging the collimator lens 2 to be displaced in the minor axis direction of the incoming beam BI because the beam shaping ratio K is less than 1. Thus, the lens frame 21 can be arranged in the above position to reduce influences from the displacement of the collimator lens 2.

As mentioned above, in the optical head according to the first embodiment, the adhesively fixed positions are arranged opposed to one another along the radial direction 31. Thus, even if the collimator lens 2 is displaced due to the variation in the applied amount of the adhesives 22, 23, and/or the variation in the adhesively fixed positions, the resulting displacement of a detected-light spot can be a reverse multiple value of the beam shaping ratio, or minimized. Further, the adhesively fixed positions are arranged symmetrically with respect to the optical axis O. Thus, even if the lens frame 21 has an expansion or contraction caused by the change of atmospheric temperature, respective forces from the adhesives 22, 23 arranged symmetrically with respect to the center of the lens frame 21 will act on the collimator lens 2 at approximately the same strength in the opposite directions, and can be mutually cancelled. This also facilitates the reduction in the displacement of the detected-light spot.

Therefore, in an operation of optically recording or reproducing information onto or from an optical recording medium, such as the optical disk 6 even under unstable atmospheric temperature, a tracking control can be accurately performed, and the displacement of a detected-light spot can be minimized to achieve a highly reliable optical head.

Figure 8:
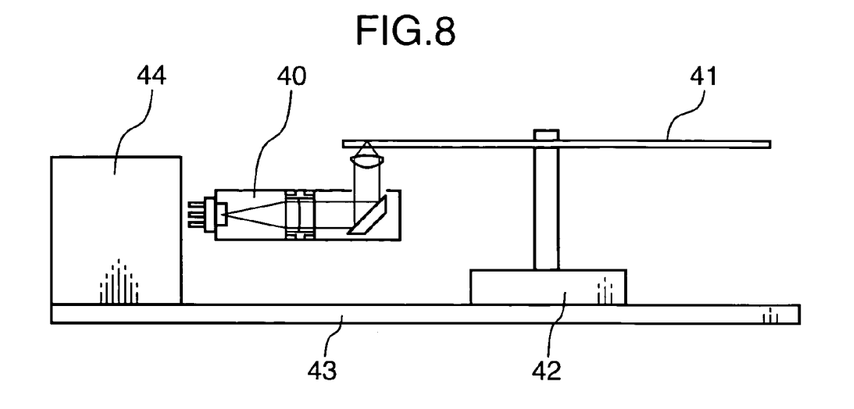
FIG. 8 is a schematic block diagram showing an optical disk drive incorporating the optical head according a first embodiment.

An optical disk drive incorporating the optical head according to the first embodiment will be described below. FIG. 8 schematically shows the structure of the optical disk drive. In FIG. 8, the reference numeral 40 indicates an optical head, and the reference numeral 41 indicates an optical disk. The reference numeral 42 indicates a motor as a driving mechanism, and this motor 42 rotatably supports the optical disk 41. The reference numeral 43 indicates a circuit board, and the reference numeral 44 indicates a power supply.

The optical disk 41 is rotated by the motor 42. The optical head 40 sends a signal corresponding to the positional relationship with the optical disk 41 to a circuit board 43. The circuit board 43 computes the received signal to generate a signal for finely moving the optical head 40 or an objective lens in the optical head 40. The optical head 40 or the objective lens in the optical head 40 performs focus servo and tracking servo to the optical disk 41, using a servo mechanism (not shown), and reading/writing/erasing of information to the optical disk 41.

The power source 44 supplies a power to the circuit board 43, the motor 42 or driving mechanism of the optical head 40, and the drive device for the objective lens. Instead of the power supply 44, a connection to an external power source may be provided. The power source 44 or the connection to an external power source may be provided in each of the driving mechanisms.

[Second Embodiment]

Figure 9:
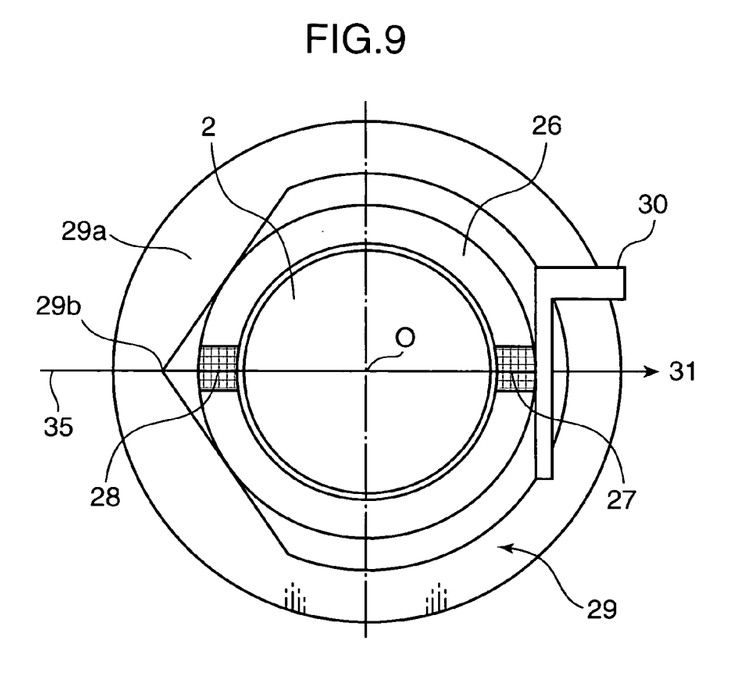
FIG. 9 is a view of a collimator-lens holding structure of an optical head according to a second embodiment of the present invention, seeing in the optical axis direction.

FIG. 9 shows a lens holding structure of an optical head according to a second embodiment of the present invention. The optical head according to the second embodiment includes an optical system having the same construction as that illustrated in FIG. 1, and the description of the optical system will be omitted.

In the second embodiment, while a lens frame 26 is formed into the same shape as that in the first embodiment, as shown in FIG. 9, it is made of a material having a linear expansion coefficient substantial equal to that of the collimator lens 2, such as ceramic materials.

The lens frame 26 is held by an outer frame 29. The outer frame 29 is made of a material having a linear expansion coefficient fairly larger than that of the lens frame 26, and may be an aluminum die-cast product. The outer frame 29 has a cylindrical shape. The inner peripheral surface of the outer frame 29 includes a V-shaped portion 29a having a cross-sectionally V-shape. This V-shaped portion 29a is formed symmetrically with respect to the straight line 35 orthogonally intersecting with the optical axis O and extending in the radial direction 31. This V-shaped portion 29a is arranged in such a manner that the apex 29b of the V-shape on its inner peripheral surface is located on the straight line 35.

The outer frame 29 is provided with a leaf spring 30 for supporting the lens frame 26. This leaf spring 30 is formed to have a dogleg shape in cross section, and attached to the axial end surface of the outer frame 29. The lens frame 26 is arranged symmetrically with respect to the straight line 35, and in contact with the inner peripheral surface of the outer frame 29 at positions located on both sides of the apex 29b of the V-shaped portion 29a. Further, the lens frame 26 receives a pressing force in the radial direction from the leaf spring 30.

The inner peripheral surface of the V-shaped portion 29a has an apex angle in the range of 90 to 150 degrees. If this apex angle is set at a value less than 90 degrees, the apex 29b of the V-shaped portion 29a has to be arranged at a position away from the center of the collimator lens 2. This causes the increase in size of the outer frame 29. Further, if the apex angle is set at a value greater than 150 degrees, it will be difficult to stably hold the lens frame 26 even using the leaf spring 30 for pressing the lens frame 26. Preferably, the apex angle is set at 120-degree to stably hold the lens frame 26 while suppressing the increase in size of the outer frame 29.

As with the first embodiment, the collimator lens 2 is adhesively fixed to the lens frame 26 using the adhesives 27, 28 at two positions opposed to one another along the radial direction 31.

Thus, even if the adhesives 27, 28 have an expansion or contraction due to the change of atmospheric temperature, respective forces from the adhesives 27, 28 will act on the collimator lens 2 at approximately the same strength in the opposite directions, and can be mutually cancelled to minimize the displacement of a detected-light spot. Further, the adhesively fixed positions are arranged opposed to one another along the radial direction 31. Thus, even if the collimator lens 2 is displaced due to the variation in the applied amount of the adhesives 22, 23, and/or the variation in the adhesively fixed positions, the resulting displacement of a detected-light spot can be a reverse multiple value of the beam shaping ratio, or minimized.

Furthermore, the lens frame 26 is made of a material, such as ceramic materials, having a linear expansion coefficient approximately the same as that of the collimator lens 2, and the leaf spring 30 presses the lens frame 26 in the radial direction 31 to allow the lens frame 26 to be fixedly held by the V-shaped portion. Thus, even if the outer frame 29 has expansion/contraction, the displacement direction of the collimator lens 2 can be aligned with the radial direction 31, so that the material of the outer frame 29 can be freely selected while suppressing the displacement of the detected-light spot, so as to provide enhanced flexibility in design.

The optical head according to the second embodiment can also be applied to the optical disk drive described in conjunction with the first embodiment. Other structures, functions and effects are the same as those of the first embodiment.

This application is based on Japanese patent application serial No. 2003-099988 filed in Japan Patent Office on Apr. 3, 2003, and No. 2004-038576 filed on Feb. 16, 2004, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical head comprising:
   a laser light source;
   a collimator lens for converting a beam emitted from said laser light source into a parallel beam;
   a lens frame holding said collimator lens;
   a beam shaping device for shaping the parallel beam passing through said collimator lens;
   an objective lens for converging the parallel beam passing through said beam shaping device on an optical recording medium formed with a track; and
   a photodetector for detecting a reflected light or transmitted light from said optical recording medium,
   wherein said lens frame is designed to hold said collimator lens in such a manner that a straight line extending in a direction of the parallel beam having the largest ratio of the diameter of the parallel beam outgoing from said beam shaping device to the diameter of the parallel beam incoming into said beam shaping device at an entrance surface is located on the same plane together with a straight line extending in a direction along the displacement in a radial direction of said collimator lens.

2. The optical head as defined in claim 1, wherein:
   said beam shaping device is designed to shape the parallel beam from an elliptical cross-section parallel beam into a circular cross-section parallel beam,
   wherein said lens frame is designed to hold said collimator lens in such a manner that a straight line extending in the minor axis of the elliptic cross-section of the parallel beam incoming into said beam shaping device at an entrance surface is located on the same plane together with a straight line extending in a direction along the displacement in said radial direction of said collimator lens.

3. The optical head as defined in claim 1, wherein said collimator lens is adhesively fixed to said lens frame in at least one of the positions of the outer peripheral surface of said collimator lens intersected by a straight line which passes through the optical axis of said collimator lens and extends in said radial direction.

4. The optical head as defined in claim 3, wherein said collimator lens is adhesively fixed to said lens frame in two positions of the outer peripheral surface of said collimator lens opposed to one another along said radial direction.

5. The optical head as defined in claim 1, further comprising an outer frame for holding said lens frame, said outer frame having an inner peripheral surface formed with a cross-sectionally V-shaped portion, said outer frame being arranged such that the apex of said V-shaped portion is located on a straight line which crosses the optical axis of said collimator lens at right angle and extends in said radial direction,
   wherein said lens frame is in contact with the inner peripheral surface of said outer frame at two positions located on both sides of said apex of said V-shaped portion and symmetrically with respect to said straight line which crosses the optical axis of said collimator lens,
   wherein said outer frame is provided with a presser member for pressing said lens frame in said radial direction.

6. The optical head as defined in claim 5, wherein said lens frame is made of a material having a linear expansion coefficient substantial equal to that of said collimator lens.

7. The optical head as defined in claim 5, wherein the inner peripheral surface of said V-shaped portion has an apex angle in the range of 90 to 150 degrees.

8. The optical head as defined in claim 4, wherein said adhesive for fixing said collimator lens to said lens frame is applied in each of said two positions at an amount in the range of 0.05 to 1.1% of the weight of said collimator lens.

9. An optical recording medium drive comprising:
   an optical head which includes a laser light source, a collimator lens for converting a beam emitted from said laser light source into a parallel beam, a lens frame holding said collimator lens, a beam shaping device for shaping the parallel beam passing through said collimator lens, an objective lens for converging the parallel beam passing through said beam shaping device on an optical recording medium formed with a track, and a photodetector for detecting a reflected light or transmitted light from said optical recording medium;

a driving mechanism for driving said optical recording medium; and a servo mechanism for controlling the position of said objective lens of said optical head, wherein said lens frame is designed to hold said collimator lens in such a maimer that a straight line extending in a direction of the parallel beam having the largest ratio of the diameter of the parallel beam outgoing from said beam shaping device to the diameter of the parallel beam incoming into said beam shaping device at an entrance surface is located on the same plane together with a straight line extending in a direction along the displacement in a radial direction of said collimator lens.

* * * * *